May 20, 1958  M. BARTLETT  2,835,327
WIPER RUBBER PROTECTOR
Filed July 15, 1955
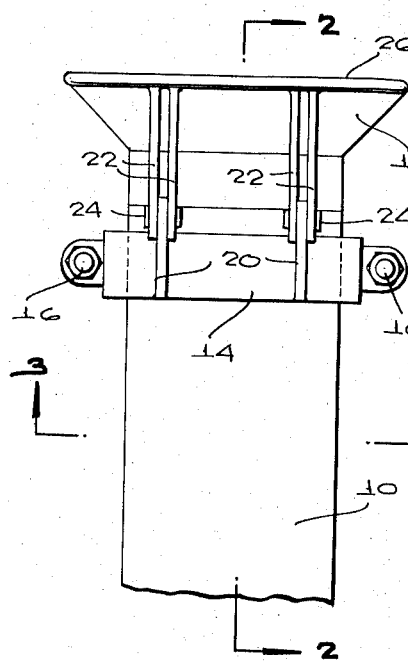
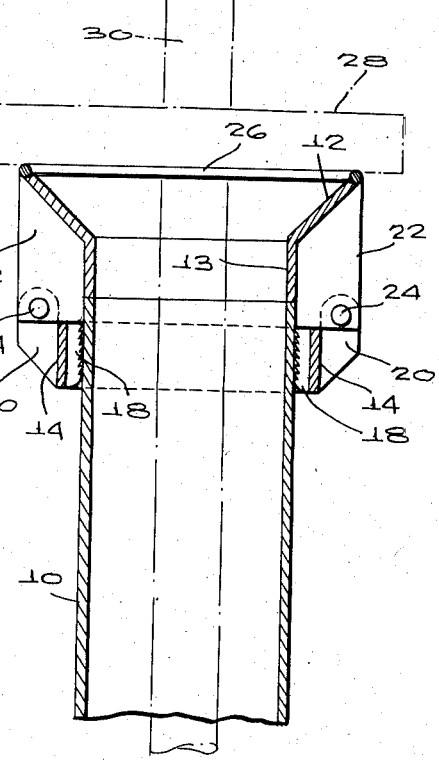
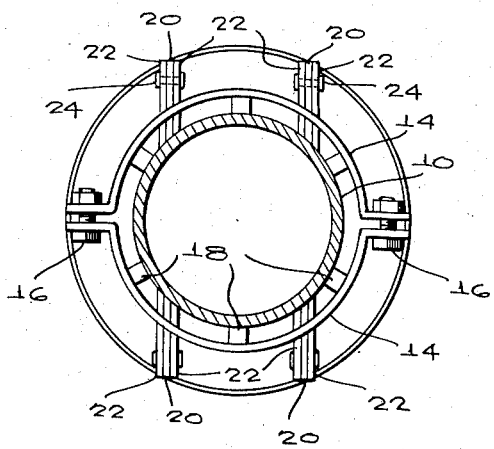
INVENTOR.
MARK BARTLETT
BY
McMorrow, Berman & Davidson
ATTORNEYS

2,835,327
WIPER RUBBER PROTECTOR

Mark Bartlett, Great Bend, Kans.

Application July 15, 1955, Serial No. 522,207

3 Claims. (Cl. 166—75)

This invention relates to a flare attachment for surface pipes used in oil well drillings.

In oil well drilling operations, a surface pipe is used, through which the drill pipe extends. The upper end of the surface pipe is cut off with a welding torch and is flared, and this leaves sharp edges on the upwardly facing flared portion thereof. When the drill pipe is pulled through the surface pipe, a rubber element is engaged about the drill pipe, in contact therewith, to wipe the same clean of mud, water, and the like.

The sharp edges of the flared upper end of the surface pipe, produced as outlined above, tend to cut the wiper, and as a result, requires frequent replacement of the wiper elements. Furthermore, the operations involved in flaring the surface pipe, so that it will be properly shaped to engage the wiper, are time and labor consuming.

The primary object of the present invention is to provide a removable flare for attachment to the upper end of a surface pipe, which eliminates the necessity for flaring the surface pipe, and which provides a smooth flared seat for the wiper rubber, and protects the wiper rubber to a maximum extent.

Another object is to provide a flare of this character which is applicable to and removable from a surface pipe with a minimum of difficulty and loss of time.

Another object of the invention is to provide a flare attachment of the character described which is reusable, so that a single flare attachment can be used on a number of different wells.

Other objects will appear from the following description, the claims appended thereto, and from the annexed drawing, in which like reference characters designate like parts throughout the several views, and wherein:

Figure 1 is a side elevational view of a surface pipe equipped with a flare attachment formed according to the present invention;

Figure 2 is a vertical sectional view on line 2—2, the dotted lines showing a conventional drill pipe and wiper rubber; and Figure 3 is a transverse sectional view on line 3—3 of Figure 1.

The reference numeral 10 designates a surface pipe, and conventionally, the pipe is cut off and flared at its upper end. In accordance with the present invention, however, the surface pipe is simply cut off squarely at its upper end, and the necessity of flaring the same, welding, etc., is dispensed with entirely.

Seated upon the squarely cut upper end of the surface pipe 10 (Figure 2) is a flared wiper seat 12, integrally formed at its lower, smaller end with a cylindrical, depending neck 13 of a diameter corresponding to that of the surface pipe, so as to abut in end to end relation against the surface pipe.

A clamp is adapted to extend about the upper end portion of the surface pipe, and comprises a pair of cooperating, semi-circular clamp members 14, 14 terminating at their respective ends in radially, outwardly projecting ears, having aligned openings receiving connecting bolts 16. Each of the clamp members 14 is provided on its inner surface with uniformly spaced slips 18, said slips being serrated from end to end thereof and being preferably extended slightly obliquely to the axis of the associated surface pipe. The slips are adapted to engage tightly against the outer surface of the surface pipe, and when the bolts 16 are tightened, said slips bite into the surface pipe to insure that the clamp will be firmly held thereagainst.

Fixedly secured at their upper ends to and extending downwardly from the flared seat 12 are pairs of chordal arms 22 with the arms of each pair spaced closely apart. As shown in Figure 3, two pairs of arms 22 are provided at opposite sides of the neck 13 and have lower ends below the neck 13. Traversing the lower ends of each pair of arms 22 is a pivot pin 24 which passes also through the upper ends of depending ears 20. Fixed to the inner edges of the ears 20 at opposite sides of the attachment are semi-circular clamp sections 14 having eared ends traversed by clamping bolts 16 to form a clamping ring which is larger in diameter than the neck 13 and the surface pipe 10. At substantially equally spaced intervals around the clamping ring the sections 14 have secured to their inner sides radial steps 18 having serrated inner ends.

By reason of this arrangement, the respective clamp sections 14 are hingedly mounted on the flare attachment body so that the clamp sections can swing toward and away from the exterior of the surface pipe 10.

A wiper of the type illustrated is of relatively flat, circular configuration, and has a center opening snugly receiving a conventional drill pipe 30, which extends through the surface pipe 10.

In use, the attachment is attached to the surface pipe merely by positioning the lower end of the neck 13 on the cut-off upper end of the surface pipe 10. The clamp sections 14 are then swung toward the outside of the surface pipe by tightening the bolts 16 sufficiently to cause the serrated inner ends of the slips 18 to bite into the outside of the surface pipe.

A drill pipe 30 is then extended through the surface pipe, with the wiper rubber 28 circumposed on the drill pipe, and, on passage of the drill pipe through the surface pipe, the marginal portion of the wiper rubber 28 will engage the rounded bead 26, and will be protectively supported thereby and upon the upper surface of the flange 17, without possibility of damage to the wiper rubber. In this way, the life of the wiper rubber is effectively prolonged.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a flare attachment for the upper end of an oil well surface pipe, a body comprising a neck of surface pipe diameter and having a lower end and an upper end, an upwardly flared flange on the upper end of the neck, arm means fixed to and depending from said flared flange and opposite sides of and extending below said neck, said arm means having lower ends below said neck, ears pivoted to and depending from the lower ends of said arm means, said ears having inner ends, semi-circular clamping ring sections fixed to the inner ends of ears at opposite sides of the said ring sections having ears on their ends, clamping bolts extending through the apertures formed in adjacent ears of the sections with nuts on said clamping bolts, said ring sections having inner sides, and slips fixed to the inner side of the ring sections, said slips having serrated inner ends for engaging a surface pipe.

2. In a flare attachment for the upper end of an oil well surface pipe, a body comprising a neck of surface pipe diameter and having a lower end and an upper end, an upwardly flared flange on the upper end of the neck, arm means fixed to and depending from said flared flange and opposite sides of said neck, said arm means having lower ends below said neck, ears pivoted to and depending from the lower ends of said arm means, said ears having inner ends, semi-circular clamping ring sections fixed to the inner ends of ears said ring sections having ears on their ends, clamping bolts extending through apertures formed in adjacent ears of the sections with nuts on said clamping bolts, said ring sections having inner sides, and slips fixed to the inner sides of the ring sections, said slips having serrated inner ends, said arm means comprising at least two pairs of spaced apart arms on opposite sides of the body, one of said pivoted ears being positioned between the arms of each pair, and said clamping ring sections being positioned below the lower ends of the arms.

3. In a flare attachment for the upper end of an oil well surface pipe, a body comprising a neck of substantially the same diameter as the upper end of the pipe and having a lower end adapted to be engaged on the upper end of the pipe, said neck having an upper end, an upwardly flared flange fixed on the upper end of the neck, vertical arms fixed to the outer sides of the neck and the flared flange and spaced around said body, said arms having lower ends extending below the lower end of the neck, vertical ears having upper ends and laterally inward ends, the upper ends of the vertical ears being horizontally pivoted on the lower ends of said vertical arms, semi-circular clamping ring sections having outer sides fixed to the inward ends of the vertical ears, said ring sections having inward sides on which pipe engaging slips are secured, said ring sections having ends having thereon laterally outwardly projecting ears, and clamping bolts extending through apertures formed in adjacent ears of the ring sections with nuts on said clamping bolts for clamping the ring sections around an oil well surface pipe.

References Cited in the file of this patent

UNITED STATES PATENTS

| | | |
|---|---|---|
| 858,575 | Clafin | June 2, 1907 |
| 1,664,643 | Rasmussen | Apr. 3, 1928 |
| 1,692,302 | Hessemer | Nov. 20, 1928 |
| 1,824,411 | Simmonds | Sept. 22, 1931 |
| 2,125,762 | Wheeler | Aug. 2, 1938 |
| 2,692,066 | Conrad | Oct. 19, 1954 |